(12) United States Patent
Kim et al.

(10) Patent No.: US 12,362,099 B2
(45) Date of Patent: Jul. 15, 2025

(54) MULTILAYER ELECTRONIC COMPONENT

(71) Applicant: SAMSUNG ELECTRO-MECHANICS CO., LTD., Suwon-si (KR)

(72) Inventors: Sang Yeop Kim, Suwon-si (KR); Jin Il Kang, Suwon-si (KR); Ji Hun Lee, Suwon-si (KR); Chang Hak Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 165 days.

(21) Appl. No.: 18/233,549

(22) Filed: Aug. 14, 2023

(65) Prior Publication Data

US 2024/0071690 A1 Feb. 29, 2024

(30) Foreign Application Priority Data

Aug. 30, 2022 (KR) .......................... 10-2022-0108919

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/224* | (2006.01) |

(52) U.S. Cl.
CPC .............. *H01G 4/30* (2013.01); *H01G 4/008* (2013.01); *H01G 4/012* (2013.01); *H01G 4/12* (2013.01); *H01G 4/224* (2013.01)

(58) Field of Classification Search
None
See application file for complete search history.

(56) References Cited

U.S. PATENT DOCUMENTS

| | | | | |
|---|---|---|---|---|
| 9,812,259 B2* | 11/2017 | Lee | .......................... | H01G 4/30 |
| 10,586,652 B1* | 3/2020 | Kwon | .................... | H01G 4/224 |
| 10,614,959 B2* | 4/2020 | Kwon | .................... | H01G 4/224 |
| 10,636,569 B2* | 4/2020 | Kwon | ................. | H01G 4/1227 |
| 11,682,525 B2* | 6/2023 | Kwon | .................... | H01G 4/224 |
| | | | | 361/301.4 |
| 11,842,853 B2* | 12/2023 | Choi | ........................ | H01G 4/30 |

(Continued)

FOREIGN PATENT DOCUMENTS

| | | |
|---|---|---|
| JP | 2015-018696 A | 1/2015 |
| KR | 10-2022-0037136 A | 3/2022 |

(Continued)

*Primary Examiner* — Dion R. Ferguson
(74) *Attorney, Agent, or Firm* — MORGAN, LEWIS & BOCKIUS LLP (57) ABSTRACT

A multilayer electronic component includes a body including a plurality of dielectric layers and internal electrodes, and an external electrode disposed on the body and connected to the internal electrodes. The body includes an active portion including the plurality of internal electrodes to form capacitance, and cover portions disposed on the active portion, and the cover portions include an outer cover portion including a carbon compound and an inner cover portion disposed between the active portion and the outer cover portion. An average carbon content (Cc2) of the outer cover portion compared to an average carbon content (Cc1) of the inner cover portion satisfies $100 \leq Cc2/Cc1 \leq 10{,}000$.

20 Claims, 7 Drawing Sheets

(56) References Cited

U.S. PATENT DOCUMENTS

| 12,230,449 B2* | 2/2025 | Kim .......................... H01G 4/30 |
| 2015/0014039 A1 | 1/2015 | Nogi et al. |
| 2015/0318110 A1* | 11/2015 | Lee .......................... H01G 4/30 |
| | | 361/301.4 |
| 2015/0348712 A1* | 12/2015 | Lee .......................... H01G 4/30 |
| | | 156/89.12 |
| 2018/0075971 A1* | 3/2018 | Lee .......................... H01G 2/22 |
| 2020/0035416 A1* | 1/2020 | Kwon ...................... H01G 4/30 |
| 2021/0210286 A1* | 7/2021 | Kwon ...................... H01G 4/30 |
| 2021/0233713 A1* | 7/2021 | Nishimura ........... H01G 4/1218 |
| 2023/0215654 A1* | 7/2023 | Kim ....................... H01G 4/012 |
| | | 361/301.4 |
| 2024/0071690 A1* | 2/2024 | Kim ....................... H01G 4/012 |

FOREIGN PATENT DOCUMENTS

| KR | 20230051241 A | * | 4/2023 | |
| WO | WO-2022070779 A1 | * | 4/2022 | ............. H01G 4/224 |

* cited by examiner

MULTILAYER ELECTRONIC COMPONENT

CROSS-REFERENCE TO RELATED APPLICATION(S)

This application claims benefit of priority to Korean Patent Application No. 10-2022-0108919 filed on Aug. 30, 2022 in the Korean Intellectual Property Office, the disclosure of which is incorporated herein by reference in its entirety.

TECHNICAL FIELD

The present disclosure relates to a multilayer electronic component.

A Multilayer Ceramic Capacitor (MLCC), a multilayer electronic component, is a chip-type capacitor serving to charge or discharge electricity by being mounted on the printed circuit boards of various electronic products such as video display devices such as liquid crystal displays (LCDs) and plasma display panels (PDPs), computers, smartphones, and mobile phones.

Such a multilayer ceramic capacitor may be used as a component of various electronic devices due to the small size, high capacitance, and ease of mounting thereof. As various electronic devices such as computers and mobile devices are miniaturized and become more highly-powered, demand for miniaturization and high capacity multilayer ceramic capacitors is increasing.

In recent years, as demand for MLCCs for automotive electronics has rapidly increased, multilayer electronic components having excellent reliability even in conditions of high heat or in the case of an external impact are required. Accordingly, there is increasing demand for high-reliability multilayer electronic components capable of implementing high capacitance in a limited space and having strong durability against vibrations and deformation. External factors that are problematic for high reliability include cracking, delamination, and penetration of external moisture. As a method to prevent these problems, a cover portion or a margin portion may be formed on the multilayer electronic component to protect the internal electrodes, but pores may occur in the cover portion or the margin portion during the sintering process, which may cause a problem of a deterioration in moisture resistance reliability.

SUMMARY

An aspect of the present disclosure is to provide a multilayer electronic component having improved moisture resistance reliability.

An aspect of the present disclosure is to provide a multilayer electronic component having improved high-temperature reliability.

An aspect of the present disclosure is to provide a multilayer electronic component having improved electrical characteristics.

According to an aspect of the present disclosure, a multilayer electronic component includes a body including a plurality of dielectric layers and a plurality of internal electrodes stacked in a first direction with the plurality of dielectric layers interposed therebetween; and an external electrode disposed on the body in a second direction, perpendicular to the first direction, and connected to the plurality of internal electrodes. The body includes an active portion including the plurality of internal electrodes to form capacitance, and cover portions disposed on both end surfaces of the active portion in the first direction, and the cover portions include an outer cover portion including a carbon compound and an inner cover portion disposed between the active portion and the outer cover portion. An average carbon content ($Cc2$) of the outer cover portion compared to an average carbon content ($Cc1$) of the inner cover portion satisfies $100 \leq Cc2/Cc1 \leq 10{,}000$.

According to an aspect of the present disclosure, a multilayer electronic component includes a body including a plurality of dielectric layers and a plurality of internal electrodes stacked in a first direction with the plurality of dielectric layers interposed therebetween; and an external electrode disposed on the body in a second direction, perpendicular to the first direction, and connected to the plurality of internal electrodes. The body includes an active portion including the plurality of internal electrodes to form capacitance and a margin portion disposed on both end surfaces of the active portion in a third direction perpendicular to the first and second directions, and the margin portion includes an outer margin portion containing a carbon compound and an inner margin portion disposed between the active portion and the outer margin portion. An average carbon content ($Mc2$) of the outer margin portion compared to an average carbon content ($Mc1$) of the inner margin portion satisfies $100 \leq Mc2/Mc1 \leq 10{,}000$.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described with reference to detailed embodiments and accompanying drawings. However, the embodiments of the present disclosure may be modified in many different forms, and the scope of the present disclosure is not limited to the embodiments described below. In addition, the embodiments of the present disclosure are provided to more completely describe the present disclosure to those skilled in the art. Therefore, the shapes and sizes of elements in the drawings may be exaggerated for clearer explanation, and elements indicated by the same reference numerals in the drawings are the same elements.

In addition, to clearly describe the present disclosure in the drawings, parts irrelevant to the description are omitted, and the size and thickness of each component illustrated in the drawings are arbitrarily illustrated for convenience of description, and thus, the present disclosure is not necessarily limited to the illustrated. Also, components having the same function within the scope of the same concept are described using the same reference numerals. Furthermore, throughout the specification, when a certain component is said to "include", it means that it may further include other components without excluding other components unless otherwise stated.

In the drawing, the first direction may be defined as the stacking direction or the thickness (T) direction, the second direction may be defined as the length (L) direction, and the third direction may be defined as the width (W) direction.

Multilayer Electronic Component

Figure 1:
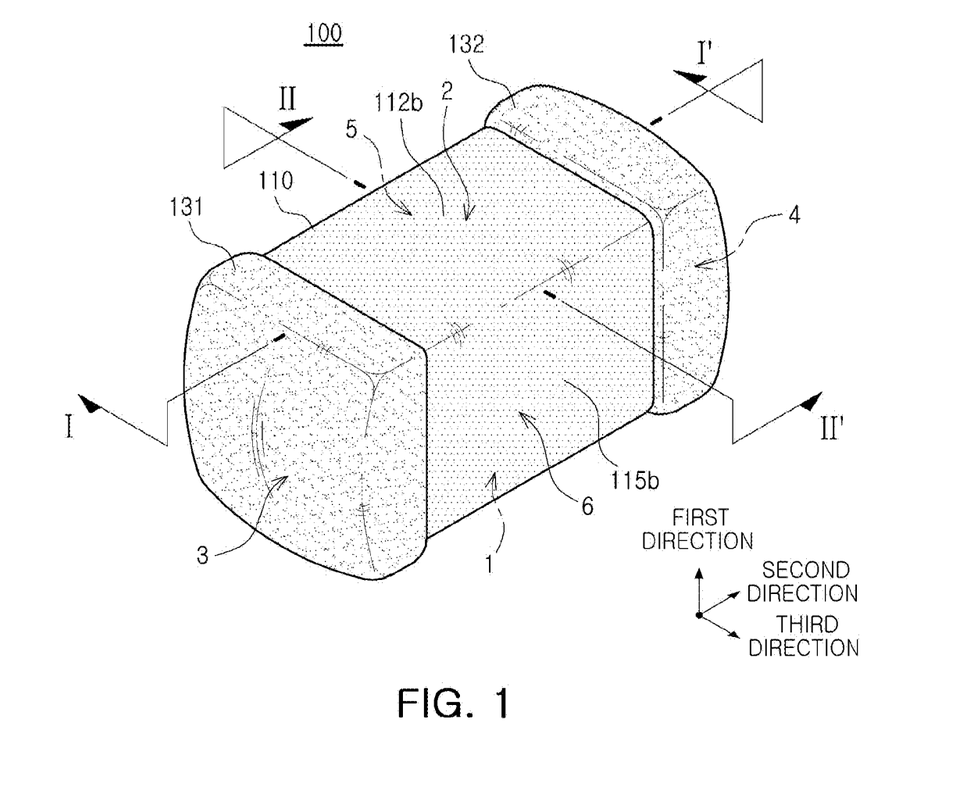
FIG. 1 schematically illustrates a perspective view of a multilayer electronic component according to an embodiment.

FIG. 1 schematically illustrates a perspective view of a multilayer electronic component according to an embodiment.

Figure 2:
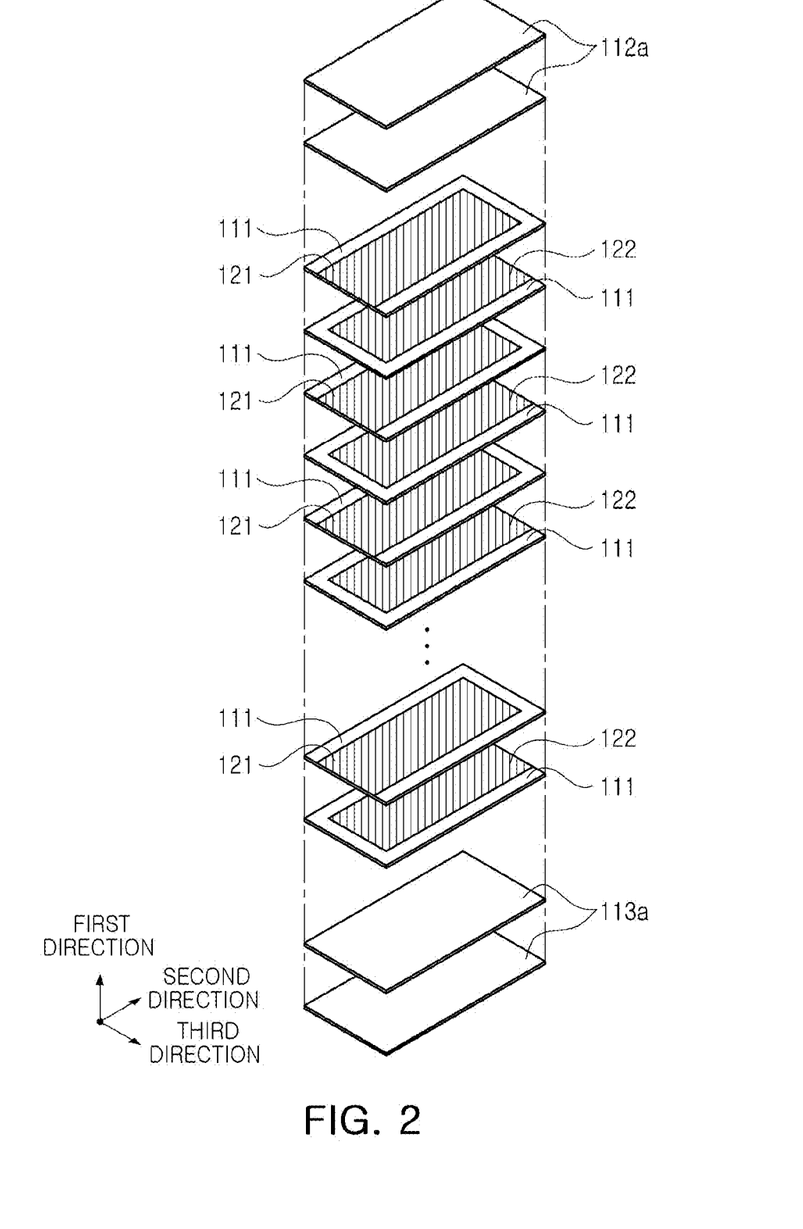
FIG. 2 schematically illustrates an exploded view of a body of a multilayer electronic component according to an embodiment.

FIG. 2 schematically illustrates an exploded view of a body of a multilayer electronic component according to an embodiment.

Figure 3:
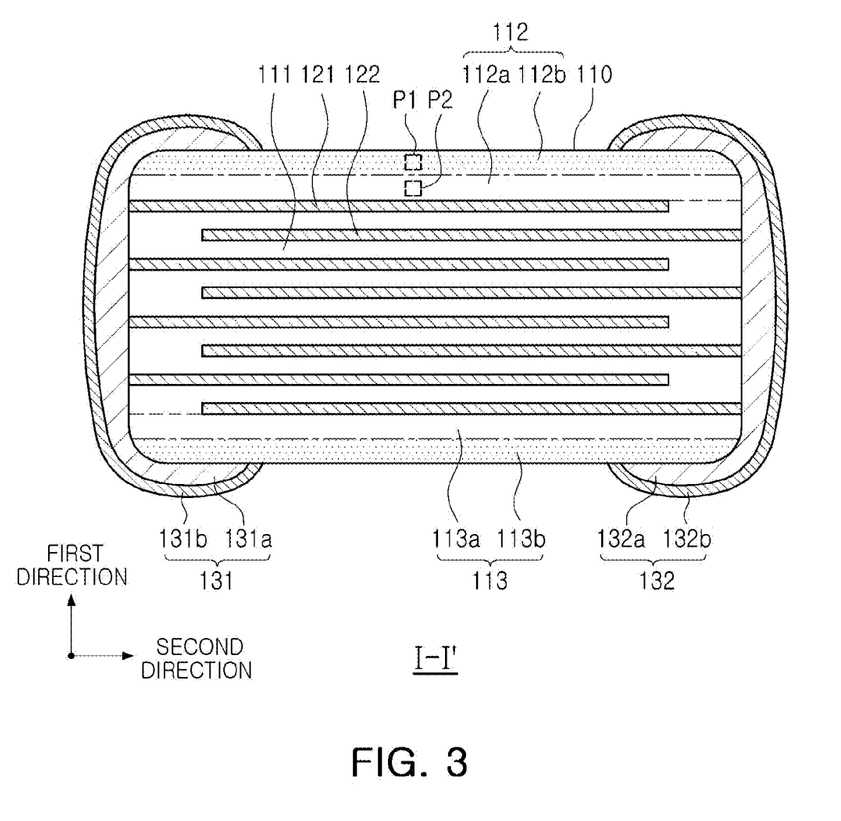
FIG. 3 schematically illustrates the cross-sectional view of FIG. 1, taken along line I-I'.

FIG. 3 schematically illustrates the cross-sectional view of FIG. 1, taken along line I-I'.

Figure 4:
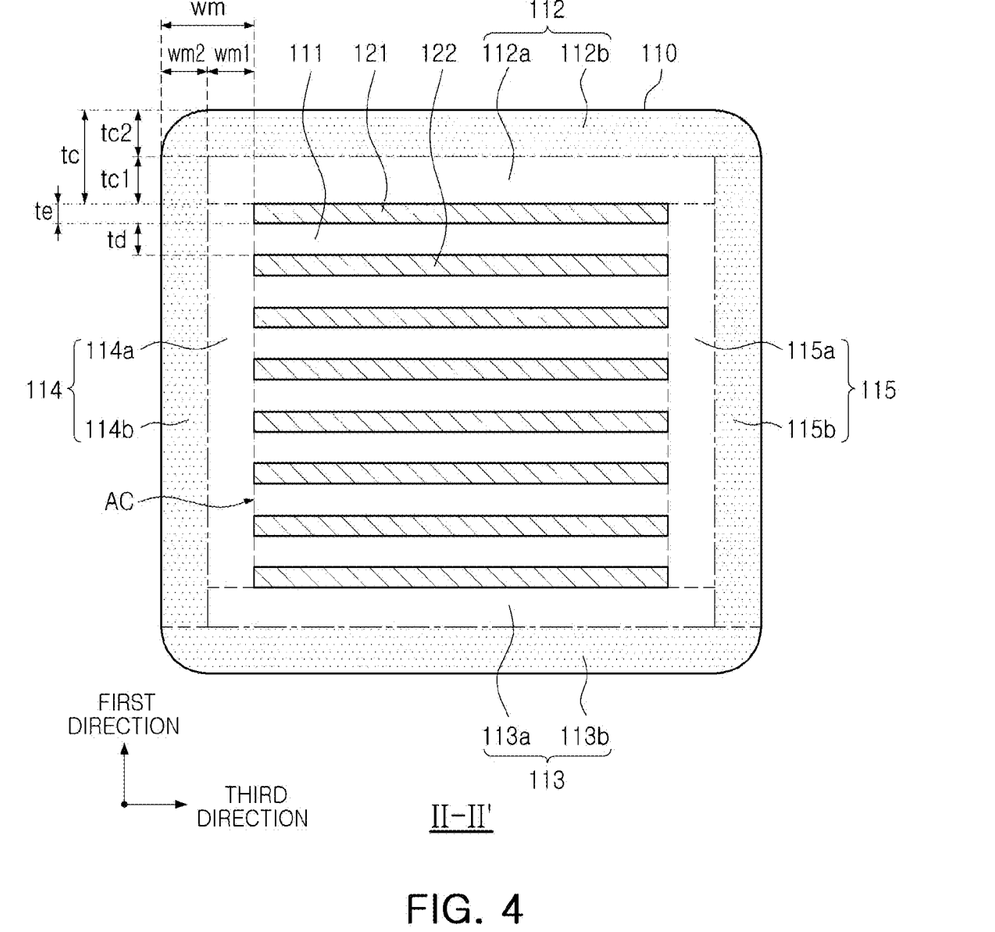
FIG. 4 schematically illustrates a cross-sectional view of FIG. 1, taken along line II-II'.

FIG. 4 schematically illustrates the sectional view of FIG. 1, taken along line II-II'.

Figure 5:
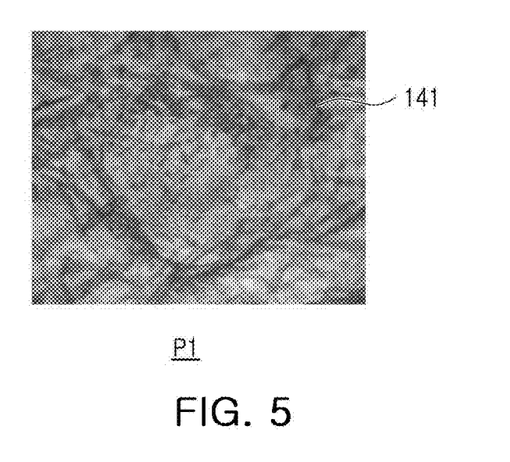
FIG. 5 is an image of region P1 of FIG. 3 taken with FT-IR equipment.

FIG. 5 is an image of region P1 of FIG. 3 taken with FT-IR equipment.

Figure 6:
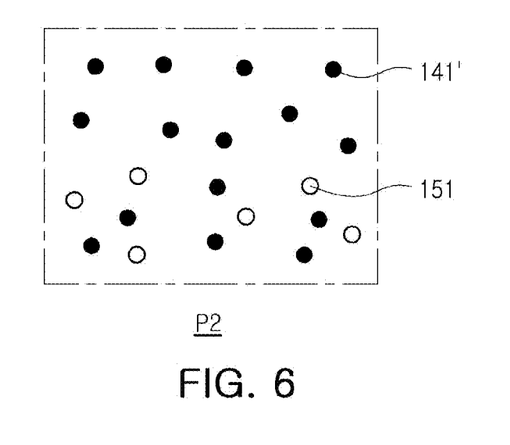
FIG. 6 schematically illustrates region P2 of FIG. 3.

FIG. 6 schematically illustrates region P2 of FIG. 3.

Figure 7A:
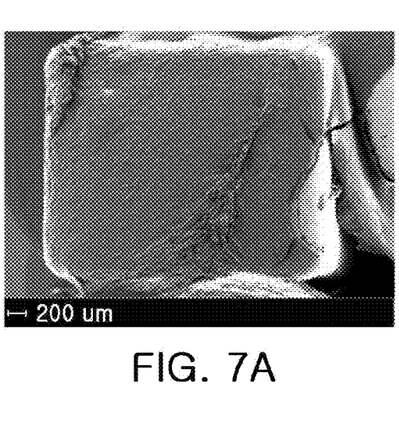
FIGS. 7A to 7C are images taken of a carbon compound according to an embodiment, using FIB equipment.
Figure 7B:
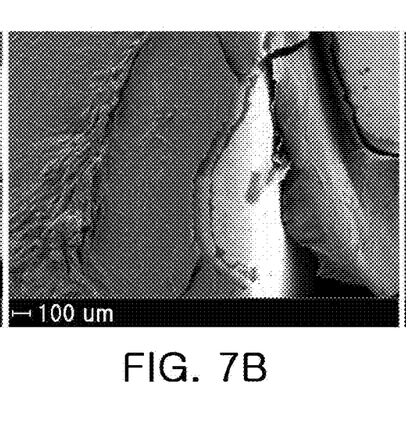
Figure 7C:
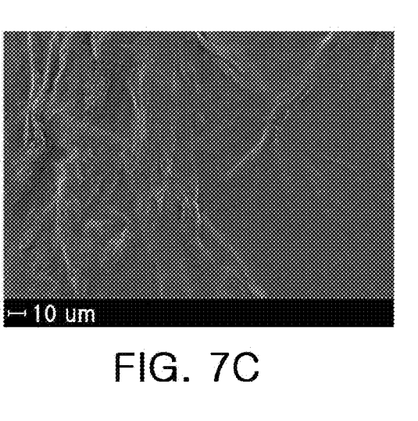

FIGS. 7A to 7C are images of a carbon compound according to an embodiment taken using FIB equipment.

Figure 8A:
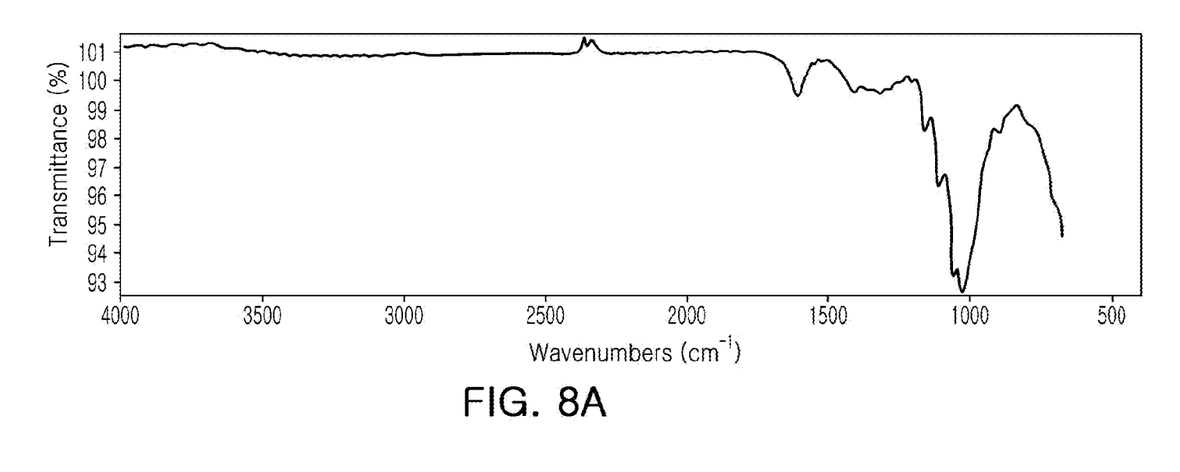
FIG. 8A is an FT-IR graph for a reference of a carbon compound, as a standard therefor.
Figure 8B:
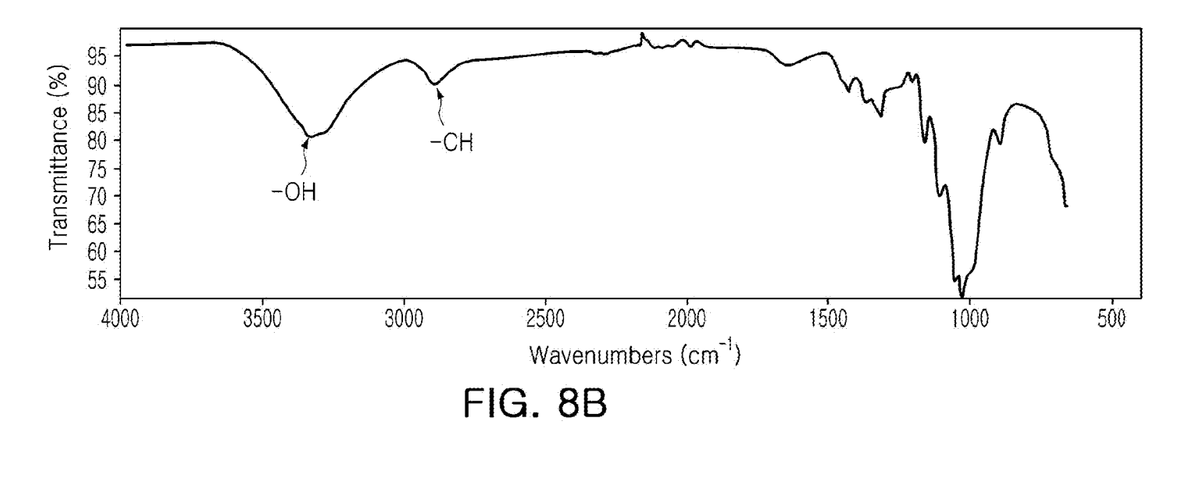
FIG. 8B is an FT-IR graph of an embodiment including a carbon compound.

FIG. 8A is an FT-IR graph for a reference of a carbon compound, and FIG. 8B is an FT-IR graph of an embodiment including a carbon compound.

Hereinafter, a multilayer electronic component according to an embodiment will be described in detail with reference to FIGS. 1 to 8B. However, a multilayer ceramic capacitor will be described as an example of a multilayer electronic component.

The present disclosure may also be applied to various electronic products using dielectric compositions, such as inductors, piezoelectric elements, varistors, or thermistors.

A multilayer electronic component 100 according to an embodiment may include a body 110 including a plurality of dielectric layers 111 and a plurality of internal electrodes 121 and 122 stacked in a first direction with the dielectric layers 111 interposed therebetween; and external electrodes 131 and 132 disposed on the body 110 in a second direction, perpendicular to the first direction, and connected to the internal electrodes 121 and 122. The body 110 may include an active portion AC including the plurality of internal electrodes 121 and 122 to form capacitance, and cover portions 112 and 113 disposed on both end surfaces of the active portion AC in the first direction. The cover portions 112 and 113 may include outer cover portions 112b and 113b containing a carbon compound 141 and inner cover portions 112a and 113a disposed between the active portion AC and the outer cover portions 112b and 113b. An average carbon content (Cc2) of the outer cover portions 112b and 113b compared to an average carbon content (Cc1) of the inner cover portions 112a and 113a may satisfy 100≤Cc2/Cc1≤10,000.

In the body 110, the plurality of dielectric layers 111 and internal electrodes 121 and 122 are alternately stacked.

In detail, the body 110 includes the first internal electrode 121 and the second internal electrode 122 disposed inside the body 110 and stacked to face each other with the dielectric layer 111 therebetween, to form and include the active portion (AC) forming capacitance.

Although the detailed shape of the body 110 is not particularly limited, as illustrated, the body 110 may have a hexahedral shape or a shape similar thereto. Due to shrinkage of the ceramic powder included in the body 110 during sintering, the body 110 may have a substantially hexahedral shape, although it does not have a hexahedral shape with perfect straight lines.

The body 110 may have first and second surfaces 1 and 2 opposing each other in a first direction, third and fourth surfaces 3 and 4 connected to the first and second surfaces 1 and 2 and opposing each other in a second direction, perpendicular to the first direction, and fifth and sixth surfaces 5 and 6 connected to the first to fourth surfaces 1, 2, 3, and 4 and opposing each other in a third direction perpendicular to the first and second directions.

The plurality of dielectric layers 111 forming the body 110 are in a fired state, and the boundary between adjacent dielectric layers 111 will be unified to the extent that it may be difficult to confirm without using a scanning electron microscope (SEM).

The raw material forming the dielectric layer 111 is not limited as long as sufficient capacitance may be obtained. In general, perovskite ($ABO_3$) materials may be used, and for example, a barium titanate-based material, a lead composite perovskite-based material, or a strontium titanate-based material may be used. The barium titanate-based material may include $BaTiO_3$-based ceramic powder, and examples of ceramic powder may include $BaTiO_3$, and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which calcium (Ca) and zirconium (Zr) are partially solid-solubilized in $BaTiO_3$.

In addition, as a raw material forming the dielectric layer 111, various ceramic additives, organic solvents, binders, dispersants, or the like may be added to powder such as barium titanate ($BaTiO_3$) according to the usage of the present disclosure.

A thickness (td) of the dielectric layer 111 does not need to be particularly limited.

However, to more easily obtain miniaturization and high capacity of the multilayer electronic component, the thickness of the dielectric layer 111 may be 0.6 μm or less, in more detail, 0.4 μm or less.

In this case, the thickness td of the dielectric layer 111 may mean the thickness td of the dielectric layer 111 disposed between the first and second internal electrodes 121 and 122.

On the other hand, the thickness td of the dielectric layer 111 may mean the size of the dielectric layer 111 in the first direction. In addition, the thickness td of the dielectric layer 111 may mean the average thickness td of the dielectric layer 111 and may mean the average size of the dielectric layer 111 in the first direction.

The average size of the dielectric layer 111 in the first direction may be measured by scanning an image of a cross section of the body 110 in the first and second directions with a scanning electron microscope (SEM) at a magnification of 10,000, and in detail, may be an average value obtained by measuring the size of one dielectric layer 111 in the first direction at 30 equally spaced points in the second direction in the scanned image. The 30 equally spaced points may be designated in the active portion AC. In addition, if the average value is measured by extending this average value measurement to 10 dielectric layers 111, the average size of the dielectric layer 111 in the first direction may be further generalized. Other methods and/or tools appreciated by one of ordinary skill in the art, even if not described in the present disclosure, may also be used.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 are alternately disposed to face each other with the dielectric layer 111 constituting the body 110 therebetween, and may be exposed to the third and fourth surfaces 3 and 4 of the body 110, respectively.

In detail, the first internal electrode 121 may be spaced apart from the fourth surface 4 and exposed through the third surface 3, and the second internal electrode 122 may be spaced apart from the third surface 3 and exposed through the fourth surface 4. A first external electrode 131 is disposed on the third surface 3 of the body 110 and connected to the first internal electrode 121, and a second external electrode 131 is disposed on the fourth surface 4 of the body 110 (132) may be disposed and connected to the second internal electrode 122.

For example, the first internal electrode 121 is connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

On the other hand, the body 110 may be formed by alternately stacking ceramic green sheets on which the first internal electrodes 121 are printed and ceramic green sheets on which the second internal electrodes 122 are printed, and then sintering the same.

Materials forming the internal electrodes 121 and 122 are not particularly limited, and materials having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes, containing at least one of nickel (Ni), copper (Cu), palladium (Pd), silver (Ag), gold (Au), platinum (Pt), tin (Sn), tungsten (W), titanium (Ti) and alloys thereof, on a ceramic green sheet. As the method of printing the conductive paste for internal electrodes, a screen printing method or a gravure printing method may be used, but the present disclosure is not limited thereto.

On the other hand, the thickness te of the internal electrodes 121 and 122 does not need to be particularly limited.

However, to more easily obtain miniaturization and high capacity of the multilayer electronic component, the thickness of the internal electrodes 121 and 122 may be 0.6 μm or less, and more preferably 0.4 μm or less.

In this case, the thickness te of the internal electrodes 121 and 122 may mean the size of the internal electrodes 121 and 122 in the first direction. In addition, the thickness te of the internal electrodes 121 and 122 may mean the average thickness te of the internal electrodes 121 and 122, and may mean the average size of the internal electrodes 121 and 122 in the first direction.

The average size of the internal electrodes 121 and 122 in the first direction may be measured by scanning the image of a cross section of the body 110 in the first and second directions with a scanning electron microscope (SEM) at a magnification of 10,000, and in detail, may be an average value obtained by measuring the size of one internal electrode 121 or 122 in the first direction at 30 equally spaced points in the second direction in the scanned image. The 30 equally spaced points may be designated in the active portion AC. In addition, if the average value is measured by extending this average value measurement to 10 internal electrodes 121 and 122, the average size of the internal electrodes 121 and 122 in the first direction may be further generalized. Other methods and/or tools appreciated by one of ordinary skill in the art, even if not described in the present disclosure, may also be used.

In recent years, as demand for MLCCs for automotive electronics has rapidly increased, multilayer electronic components having excellent reliability even in conditions of high heat or in the case of an external impact are required. Accordingly, there is an increasing demand for high-reliability multilayer electronic components capable of realizing high capacity in a limited space and having strong durability against vibration and deformation. External factors that are problematic in high reliability include cracks, delamination, and penetration of external moisture. As a way to improve these problems, a cover portion or a margin portion may be formed in the multilayer electronic component to protect the internal electrodes. Pores may be generated in the cover portion or the margin portion during the sintering process, which may cause deterioration in moisture resistance reliability.

In an embodiment, the body 110 includes a plurality of internal electrodes 121 and 122 to form an active portion AC, and cover portions 112 and 113 disposed on both end surfaces of the active portion AC in the first direction. The cover portions 112 and 113 include outer cover portions 112b and 113b containing the carbon compound 141 and inner cover portions 112a and 113a disposed between the active portion AC and the outer cover portions 112b and 113b, and the average carbon content (Cc2) of the outer cover portions 112b and 113b compared to the average carbon content (Cc1) of the inner cover portions 112a and 113a may satisfy $100 \leq Cc2/Cc1 \leq 10{,}000$.

For example, the body 110 may include cover portions 112 and 113 disposed on both end surfaces of the active portion AC in the first direction.

In detail, the body 110 may include an upper cover portion 112 disposed on the active portion AC in the first direction and a lower cover portion 113 disposed below the active portion AC in the first direction.

For example, the upper cover portion 112 may be disposed on the second surface 2 of the active portion AC, and the lower cover portion 113 may be disposed on the first surface 1 of the active portion AC.

In this case, the cover portions 112 and 113 include the outer cover portions 112b and 113b containing the carbon compound 141 and the inner cover portions 112a and 113a disposed between the active portion AC and the outer cover portions 112b and 113b.

In detail, the cover portions 112 and 113 may include inner cover portions 112a and 113a disposed on both ends of the active portion AC in the first direction and outer cover portions 112b and 113b disposed on the inner cover portions 112a and 113a.

For example, the upper cover portion 112 may include an upper inner cover portion 112a disposed on the second surface 2 of the active portion AC and an upper outer cover portion 112b disposed on the upper inner cover portion 112a. The lower cover portion 113 may include a lower inner cover portion 113a disposed on the first surface 1 of the active portion AC and a lower outer cover portion 113b disposed on the lower inner cover portion 113a.

Unless otherwise stated herein, the inner cover portions 112a and 113a are described as including the upper inner cover portion 112a and the lower inner cover portion 113a, and likewise, the outer cover portions 112b and 113b will be described including an upper outer cover portion 112b and a lower outer cover portion 113b.

The cover portions 112 and 113 may basically serve to prevent damage to the internal electrodes 121 and 122 due to physical or chemical stress.

The inner cover portions 112a and 113a may be formed by stacking a single dielectric layer 111 or two or more dielectric layers 111 on the upper and lower surfaces of the active portion AC in a first direction, respectively.

The inner cover portions 112a and 113a do not include the internal electrodes 121 and 122 and may include the same material as the dielectric layer 111. For example, the inner cover portions 112a and 113a may include a ceramic material, and for example, may include a barium titanate (BaTiO$_3$)-based ceramic material.

The outer cover portions 112b and 113b may include a carbon compound 141.

The carbon compound 141 refers to a compound having an organic structure having carbon as a basic skeleton, and for example, may include at least one selected from the group consisting of cellulose nanofibers, carbon nanotubes, carbon nanofoam, hydrocarbons, fullerene, and nano clay, but the present disclosure is not particularly limited thereto. The number of carbon atoms in the carbon compound is not particularly limited, and may be sufficient as long as it could be disposed in the pore position or fill the pore after firing.

After sintering the body 110 including the inner cover portions 112a and 113a, the outer cover portions 112b and 113b may be formed by post-processing the outer cover portions 112b and 113b on the inner cover portions 112a and 113a. In this case, the outer cover portions 112b and 113b may be formed by heat-treating a slurry containing the carbon compound 141.

In detail, after sintering, a chip including the inner cover portions 112a and 113a is horizontally mounted on a film that is easily contracted/expanded, and then a carbon compound is disposed on the inner cover portions 112a and 113a. A method of applying a slurry may be used. For example, using a screen printing method in which, after horizontally mounting on a film, the fifth surface 5, the second surface 2, the sixth surface 6, and the first surface 1 are rotated and applied in the order, and a method of dipping in a slurry containing a carbon compound may be used, but is not particularly limited thereto.

After the slurry containing the carbon compound 141 is applied on the chip, heat treatment may be performed to form the outer cover portions 112b and 113b. In this case, as the heat treatment method, for example, an electrode sintering furnace, an 02 oven, nitrogen heat treatment, or a method of applying UV may be used, but is not particularly limited thereto.

In detail, after applying a slurry containing a carbon compound to the body that has completed the sintering process, the chip having the external electrode paste formed on the body is put into an electrode sintering furnace, A method of simultaneously sintering the outer cover portion and the external electrode may be used.

As the slurry containing the carbon compound 141 is applied on the inner cover portions 112a and 113a, the active portion AC has the cover portions 112 and 113 of a double layer structure made of a heterogeneous structure, and external moisture penetration may be effectively blocked, and moisture resistance reliability may be improved.

The inner cover portions 112a and 113a may form pores 151 while materials such as carbon escape to the outside during the sintering process, and these pores 151 may serve as penetration paths for external moisture or plating solution. Accordingly, by forming the outer cover portions 112b and 113b on the inner cover portions 112a and 113a, the pores 151 may be filled and moisture resistance may be improved.

On the other hand, FIG. 5 is an image taken with Fourier Transform-Infrared Spectroscopy (FT-IR) equipment on the surface of cellulose nanofibers, which is an embodiment, and FIG. 8B is a graph of FT-IR results obtained by analyzing a component by selecting an arbitrary point in FIG. 5. The carbon compound included in the outer cover portions 112b and 113b, for example, cellulose nanofibers, may be identified in the outer cover portions 112b and 113b of the first and second cross-sections of the body 110, which may correspond to region P1 in FIG. 3.

FIG. 6 schematically illustrates an enlarged view of region P2 of the inner cover portions 112a and 113a in cross-sections of the body 110 in the first and second directions.

In detail, among the carbon compounds, a slurry containing gel-type cellulose nanofibers may be applied on the inner cover portions 112a and 113a to form the outer cover portions 112b and 113b. In this case, the pores 151 generated during the heat treatment process of the inner cover portions 112a and 113a may be filled with gel-type cellulose nanofibers.

In detail, when performing heat treatment after applying gel-type cellulose nanofibers, the heat treatment may be performed at a temperature lower than the sintering temperature of the inner cover portions 112a and 113a, and the pores 151 generated in the inner cover portions 112a and 113a as the carbon of the cellulose nanofibers is partially decomposed may be filled. As the heterogeneous carbon compound 141' different from the carbon compound 141 is formed at the position of the pores 151, moisture resistance reliability may be improved. In this case, the heat treatment for forming the outer cover portions 112b and 113b is preferably lower than the sintering temperature of the body 110, and when the heat treatment is performed at a temperature equal to or higher than the sintering temperature of the body 110, the carbon compound is thermally decomposed and moisture resistance reliability may rather deteriorate. The presence of the heterogeneous carbon compound 141' may be detected by FT-IR, XRD, SEM, SEM-EDS, TEM, or TEM-EDS. Other methods and/or tools appreciated by one of ordinary skill in the art, even if not described in the present disclosure, may also be used. The heterogeneous carbon compound 141' may be different from the carbon compound in terms of the composition and/or morphology.

On the other hand, carbon after heat treatment to form the outer cover portions 112b and 113b may be defined as residual carbon. The average carbon content (Cc1) of the outer cover portions 112b and 113b may mean the average amount of remaining carbon.

In an embodiment, the inner cover portions 112a and 113a may include a different carbon compound 141' different from the carbon compound 141 included in the outer cover portions 112b and 113b.

This may be because the heterogeneous carbon compound 141' is formed as the carbon compound 141 fills the pores 151 of the inner cover portions 112a and 113a.

On the other hand, pores 151 may be present in the inner cover portions 112a and 113a, and may be more pores than those present in the outer cover portions 112b and 113b.

For example, the porosity of the inner cover portions 112a and 113a may be higher than that of the outer cover portions 112b and 113b.

In this case, the porosity of the inner cover portions 112a and 113a may mean the volume of the pores 151 compared to the total volume of the inner cover portions 112a and 113a, and may mean the area of the pores 151 compared to the area of the inner cover portions 112a and 113a based on the cross-section, and the porosity of the outer cover portions 112b and 113b may also have the same meaning. The porosity of the inner cover portions 112a and 113a and the outer cover portions 112b and 113b may be determined by SEM or TEM. Other methods and/or tools appreciated by one of ordinary skill in the art, even if not described in the present disclosure, may also be used.

FIGS. 7A to 7C illustrate images provided by capturing the fourth surface 4 of the outer cover portions 112b and 113b including the carbon compound 141 according to an embodiment with a Focused Ion Beam (FIB) device, which corresponds to an embodiment in which cellulose nanofibers, which are carbon compounds, are applied to the surface of the body 110.

FIG. 8A is an FT-IR graph of a known reference for carbon compounds, and FIG. 8B is a graph obtained by analyzing the surface of an embodiment including a carbon compound, for example, the surface of the outer cover portions 112b and 113b including cellulose, using FT-IR equipment.

Comparing and analyzing this, it can be seen that FIG. 8A, which is a reference, and FIG. 8B, which is an embodiment, have similar overall graph shapes, and therefore, it can be confirmed that a carbon compound is included in FIG. 8B.

In detail, in FIG. 8A, which is a comparative example, since it corresponds to the reference information of cellulose nanofibers, which are pure carbon compounds, peaks related to —OH groups and —CH groups were not detected, whereas, in FIG. 8B, which is an example, it can be confirmed that peaks related to —OH groups and —CH groups, which are water and carbon compounds, are detected because they correspond to gel-type cellulose nanofibers. For example, since FIG. 8B is similar in shape to the FT-IR analysis graph of FIG. 8A in addition to peaks related to —OH and —CH groups, it can be confirmed that a carbon compound is formed in FIG. 8B.

In summary, it is possible to check whether a carbon compound is formed on a detailed surface using FT-IR equipment, but is not particularly limited thereto. It can be confirmed that a carbon compound is formed using any equipment capable of detecting carbon.

The average carbon content (Cc2) of the outer cover portions 112b and 113b compared to the average carbon content (Cc1) of the inner cover portions 112a and 113a may satisfy $100 \leq Cc2/Cc1 \leq 10,000$.

When the average carbon content (Cc2) of the outer cover portions 112b and 113b compared to the average carbon content (Cc1) of the inner cover portions 112a and 113a satisfies $100 \leq Cc2/Cc1 \leq 10,000$, moisture resistance reliability may be improved.

When the average carbon content (Cc2) of the outer cover portions 112b and 113b compared to the average carbon content (Cc1) of the inner cover portions 112a and 113a is less than 100, since the average carbon content of the outer cover portions 112b and 113b is low, the pores 151 of the inner cover portions 112a and 113a cannot be sufficiently filled with carbon. There is a possibility that a problem of inferior moisture resistance reliability may occur. When the average carbon content (Cc2) of the outer cover portions 112b and 113b compared to the average carbon content (Cc1) of the inner cover portions 112a and 113a exceeds 10,000, in the process of forming the cover portions 112 and 113 of the double layer structure, the sintering does not proceed completely due to the excessive average carbon content of the outer cover portions 112b and 113b. Reliability may be deteriorated due to cracks or delamination.

According to an embodiment, the average carbon content (Cc1) included in the inner cover portions 112a and 113a may be greater than 0 ppm and less than 100 ppm.

The average carbon content may be finely detected or varied in the inner cover portions 112a and 113a depending on the dielectric powder or the sintering temperature, but the content range may mean almost no carbon, and in addition, may be the average carbon content (Cc1) measured including the heterogeneous carbon compound 141'.

The average carbon content of the cover portions 112 and 113 may be quantitatively analyzed through a general residual carbon meter. Other methods and/or tools appreciated by one of ordinary skill in the art, even if not described in the present disclosure, may also be used. In detail, the average carbon content (Cc1) of the inner cover portions 112a and 113a is the average carbon content of a chip in which only the inner cover portions 112a and 113a are formed after the outer cover portions 112b and 113b are separated, and may be a value obtained by measuring the content (Cc1). The average carbon content (Cc2) of the outer cover portions 112b and 113b may be a value obtained by measuring the carbon content of the separated outer cover portions 112b and 113b. Alternatively, the average carbon content (Cc2) of the outer cover portions 112b and 113b may be a value obtained by measuring the average carbon content (Cc2) of a chip on which the inner cover portions 112a and 113a and the outer cover portions 112b and 113b are formed.

On the other hand, the thickness tc of the cover portions 112 and 113 does not need to be particularly limited.

However, to more easily obtain miniaturization and high capacity of the multilayer electronic component, the thickness tc of the cover portions 112 and 113 may be 100 μm or less, and may be preferably 30 μm or less, and more preferably 20 μm or less for ultra-small products.

In this case, the thickness tc of the cover portions 112 and 113 may mean the size of the cover portions 112 and 113 in the first direction. In addition, the thickness tc of the cover portions 112 and 113 may mean the average thickness tc of the cover portions 112 and 113, and may mean the average size of the cover portions 112 and 113 in the first direction.

The average size of the cover portions 112 and 113 in the first direction may be measured by scanning an image of a cross section of the body 110 in the first and third directions with a scanning electron microscope (SEM) at a magnification of 10,000. In detail, an average value may be obtained by measuring the thickness at 30 equally spaced points of one cover portion 112 or 113 in the third direction in the scanned image. The 30 equally spaced points may be designated on the upper cover portion 112. Other methods and/or tools appreciated by one of ordinary skill in the art, even if not described in the present disclosure, may also be used.

In an embodiment, the average size tc2 of the outer cover portions 112b and 113b in the first direction compared to the average size tc of the cover portions 112 and 113 in the first direction is $0.1 < tc2/tc < 0.9$ may be satisfied.

In detail, the average size tc of the cover portions 112 and 113 in the first direction may mean the value obtained by adding the average size tc1 of the inner cover portions 112a and 113a in the first direction and the average size tc2 of the outer cover portions 112b and 113b in the first direction. When expressed as a percentage, 10%<tc2/tc<90% may be satisfied. When the average size tc2 of the outer cover portions 112b and 113b in the first direction compared to the average size (tc) of the cover portions 112 and 113 in the first direction satisfies 0.1<tc2/tc<0.9, moisture resistance reliability is may be improved.

When the average size tc2 of the outer cover portions 112b and 113b in the first direction compared to the average size tc of the cover portions 112 and 113 in the first direction is less than 0.1, due to the lack of carbon compounds, it may be difficult to sufficiently fill the pores, When the average size tc2 of the outer cover portions 112b and 113b in the first direction compared to the average size tc of the cover portions 112 and 113 in the first direction is greater than 0.9, since the thickness tc1 of the inner cover portions 112a and 113a is not sufficient, protection of the internal electrodes may be insufficient.

The average size of the inner cover portions 112a and 113a or the outer cover portions 112b and 113b in the first direction may be obtained by the same measurement method as the average size of the cover portions 112 and 113 in the first direction.

In the multilayer electronic component 100 according to another embodiment, the body 110 may include an active portion AC including the plurality of internal electrodes 121 and 122 to form capacitance; and margin portions 114 and 115 disposed on both end surfaces of the active portion AC in the third direction. The margin portions 114 and 115 include outer margin portions 114b and 115b containing the carbon compound 141 and inner margin portions disposed between the active portion AC and the outer margin portions 114b and 115b. Including 114a, 115a, and the average carbon content (Mc2) of the outer margin portions 114b and 115b compared to the average carbon content (Mc1) of the inner margin portions 114a and 115a may satisfy 100≤Mc2/Mc1≤10,000.

The carbon compound 141 included in the margin portions 114 and 115 may be the same as the carbon compound 141 included in the cover portions 112 and 113, and overlapping descriptions will be omitted.

The body 110 may include margin portions 114 and 115 disposed on both end surfaces of the active portion AC in the third direction.

In detail, the margin portions 114 and 115 may include the first margin portion 114 disposed on the fifth surface 5 of the active portion AC, and may include the second margin portion 115 disposed on the sixth surface 6 of the active portion AC. For example, the margin portions 114 and 115 may be disposed at both ends of the active portion AC in the third direction.

As illustrated, the margin portions 114 and 115 are formed at both ends of the first and second internal electrodes 121 and 122 in the third direction, based on cross sections of the body 110 cut in the second and third directions, and may refer to the area between the boundary surfaces of the body 110.

In this case, the margin portions 114 and 115 include the outer margin portions 114b and 115b including the carbon compound 141 and the inner margin portion 114a disposed between the active portion AC and the outer margin portions 114b and 115b.

In detail, the margin portions 114 and 115 may include inner margin portions 114a and 115a disposed on both ends of the active portion AC in the third direction, and outer margin portions 114b and 115b disposed on the inner margin portions 114a and 115a.

For example, the first margin portion 114 includes a first inner margin portion 114a disposed on the fifth surface 5 of the active portion AC and a first outer margin portion 114b disposed on the first inner margin portion 114a. The second margin portion 115 includes a second inner margin portion 115a disposed on the sixth surface 6 of the active portion AC and a second outer margin portion 115b disposed on the second inner margin portion 115a.

Unless otherwise specified herein, the inner marginal portions 114a and 115a are described including the first inner marginal portion 114a and the second inner marginal portion 115a, and similarly, the outer marginal portions 114b and 115b will be described including the first outer marginal portion 114b and the second outer marginal portion 115b.

The margin portions 114 and 115 may basically serve to prevent damage to the internal electrodes 121 and 122 due to physical or chemical stress.

Internal electrodes 121 and 122 are formed on the inner margin portions 114a and 115a by applying a conductive paste on the ceramic green sheet, except where the inner margin portions 114a and 115a are to be formed, and to suppress the step difference caused by the internal electrodes 121 and 122, after the stacked internal electrodes 121 and 122 are cut to expose the fifth and sixth surfaces 5 and 6 of the body 110, a single dielectric layer 111 or two or more dielectric layers 111 may be stacked on both end surfaces of the active portion AC in the third direction in the third direction.

The inner margin portions 114a and 115a do not include the internal electrodes 121 and 122 and may include the same material as the dielectric layer 111. For example, the inner margin portions 114a and 115a may include a ceramic material, for example, a barium titanate ($BaTiO_3$)-based ceramic material.

The outer margin portions 114b and 115b may include a carbon compound.

The carbon compound 141 refers to a compound having an organic structure having carbon as a basic skeleton, and for example, may include at least one selected from the group consisting of cellulose nanofibers, carbon nanotubes, carbon nanofoam, hydrocarbons, fullerene, and nano clay, but is not particularly limited thereto.

A method of forming the outer margin portions 114b and 115b may be the same as the method of forming the outer cover portions 112b and 113b described above.

As the slurry containing the carbon compound 141 is applied on the inner margin portions 114a and 115a, the active portion AC has the margin portions 114 and 115 having a dual-layer structure composed of a heterogeneous structure, and external moisture penetration may be effectively blocked, and moisture resistance reliability may be improved.

The inner margin portions 114a and 115a may form pores 151 while materials such as carbon escape to the outside during the sintering process. These pores 151 may be penetration paths of external moisture or a plating solution. Accordingly, by forming the outer margin portions 114b and 115b on the inner margin portions 114a and 115a, the pores 151 may be filled and moisture resistance may be improved.

For example, when applying gel-type cellulose nanofibers among the carbon compounds to the inner margin portions 114a and 115a, pores generated during the heat treatment process of the inner margin portions 114a and 115a (pore) is filled with the carbon of gel-type cellulose nanofibers, so moisture resistance reliability may be improved.

The carbon compound 141 on the outer margin portions 114b and 115b may be identified through FT-IR equipment on the outer margin portions 114b and 115b of the first and third cross-sections of the body 110.

The carbon compound 141 included in the outer margin portions 114b and 115b may fill the pores 151 of the inner margin portions 114a and 115a. As a heterogeneous carbon compound 141' different from the carbon compound 141 is formed at the position of the pore 151, moisture resistance reliability may be improved. Content that overlaps with the above will be omitted.

In an embodiment, the inner margin portions 114a and 115a may include a different carbon compound 141' different from the carbon compound 141 included in the outer margin portions 114b and 115b.

On the other hand, pores 151 may exist in the inner margin portions 114a and 115a, and may have more pores than those present in the outer margin portions 114b and 115b.

For example, the porosity of the inner margin portions 114a and 115a may be higher than that of the outer margin portions 114b and 115b.

In this case, the term "porosity" may have the same meaning as the porosity of the aforementioned inner cover portions 112a and 113a. The porosity of the inner margin portions 114a and 115a and the outer margin portions 114b and 115b may be determined by SEM or TEM. Other methods and/or tools appreciated by one of ordinary skill in the art, even if not described in the present disclosure, may also be used.

The carbon compound 141 included in the outer margin portions 114b and 115b may be checked with an FIB device, and since it is the same as the above, it will be omitted.

According to an embodiment, the average carbon content (Mc2) of the outer margin portions 114b and 115b compared to the average carbon content (Mc1) of the inner margin portions 114a and 115a satisfies 100≤Mc2/Mc1≤10,000.

When the average carbon content (Mc2) of the outer margin portions 114b and 115b compared to the average carbon content (Mc1) of the inner margin portions 114a and 115a satisfies 100≤Mc2/Mc1≤10,000, moisture resistance reliability may be improved.

When the average carbon content (Mc2) of the outer margin portions 114b and 115b compared to the average carbon content (Mc1) of the inner margin portions 114a and 115a is less than 100, since the average carbon content of the outer margin portions 114b and 115b is low, the pores 151 of the inner margin portions 114a and 115a cannot be sufficiently filled with carbon. There is a possibility that a problem of inferior moisture resistance reliability may occur. When the average carbon content (Mc2) of the outer margin portions 114b and 115b compared to the average carbon content (Mc1) of the inner margin portions 114a and 115a exceeds 10,000, in the process of forming the marginal portions 114 and 115 of the double layer structure, the sintering does not proceed completely due to the excessive average carbon content of the outer marginal portions 114b and 115b. Reliability may be deteriorated due to cracks or delamination.

According to an embodiment, the average carbon content (Mc1) included in the inner margin portions 114a and 115a may be greater than 0 ppm and less than 100 ppm.

The carbon content of the inner margin portions 114a and 115a may be finely detected or varied depending on the dielectric powder or sintering temperature, but the content range may mean almost no carbon. In addition, the carbon content of the inner margin portions 114a and 115a may be the average carbon content (Mc1) measured including the heterogeneous carbon compound 141'.

The average carbon content of the margin portions 114 and 115 may be analyzed through a general residual carbon meter. Other methods and/or tools appreciated by one of ordinary skill in the art, even if not described in the present disclosure, may also be used.

In detail, the average carbon content (Mc1) of the inner margin portions 114a and 115a is the average carbon content of a chip in which only the inner margin portions 114a and 115a are formed after the outer margin portions 114b and 115b are separated, and may be a value obtained by measuring the content (Mc1). The average carbon content (Mc2) of the outer margin portions 114b and 115b may be a value obtained by measuring the carbon content of the separated outer margin portions 114b and 115b. Alternatively, the average carbon content (Mc2) of the outer margin portions 114b and 115b may be a value obtained by measuring the average carbon content (Mc2) of a chip in which the inner margin portions 114a and 115a and the outer margin portions 114b and 115b are formed.

On the other hand, the width wm of the margin portions 114 and 115 does not need to be particularly limited.

However, to more easily obtain miniaturization and high capacity of the multilayer electronic component 100, the width wm of the first and second margin portions 114 and 115 may be 100 μm or less, preferably 30 μm or less, and in ultra-small products, may be more preferably 20 μm or less.

In this case, the width wm of the margin portions 114 and 115 may mean the size of the margin portions 114 and 115 in the third direction. Further, the width wm of the margin portions 114 and 115 may mean the average width wm of the margin portions 114 and 115, and may mean the average size of the margin portions 114 and 115 in the third direction.

The average size of the margin portions 114 and 115 in the third direction may be measured by scanning the image of a cross section of the body 110 in the first and third directions with a scanning electron microscope (SEM) at a magnification of 10,000, and in detail, may be an average value obtained by measuring the size of one margin portion 114 or 115 in the third direction at 30 equally spaced points in the first direction in the scanned image. The 30 equally spaced points may be designated in the first margin portion 114. Other methods and/or tools appreciated by one of ordinary skill in the art, even if not described in the present disclosure, may also be used.

In an embodiment, the average size wm2 of the outer margin portions 114b and 115b in the third direction compared to the average size wm of the margin portions 114 and 115 in the third direction is 0.1<wm2/wm<0.9 may be satisfied.

In detail, the average size wm of the margin portions 114 and 115 in the third direction is the average size wm1 of the inner margin portions 114a and 115a in the third direction and the average size wm1 of the outer margin portions 114b and 115b in the third direction, and may mean the value added to the average size wm2, when expressed as a percentage, 10%<wm2/wm<90% may be satisfied.

When the average size wm2 of the outer margin portions 114b and 115b in the third direction compared to the average size wm of the margin portions 114 and 115 in the third direction satisfies 0.1<wm2/wm<0.9, moisture resistance reliability is high.

If the average size wm2 of the outer margin portions 114b and 115b in the third direction compared to the average size wm of the margin portions 114 and 115 in the third direction is less than 0.1, the carbon compound is insufficient and it is difficult to sufficiently fill open pores, and if the average size wm2 of the margin portions 114b and 115b in the third direction compared to the average size wm of the margin portions 114 and 115 in the third direction exceeds 0.9, the thickness wm1 of the inner margin portions 114a and 115a is not sufficient, and therefore, the protection of the internal electrode may be insufficient.

The average size of the inner marginal portions 114a and 115a or the outer marginal portions 114b and 115b in the third direction may be obtained by the same measurement method as the average size of the marginal portions 114 and 115 in the third direction.

Although a structure in which the ceramic electronic component 100 includes two external electrodes 131 and 132 is described in an embodiment, the number and shape of the external electrodes 131 and 132 are different from those of the internal electrodes 121 and 122 may be changed according to the shape or other purposes.

The external electrodes 131 and 132 may be disposed on the body 110 and connected to the internal electrodes 121 and 122.

In detail, the external electrodes 131 and 132 are disposed on the third and fourth surfaces 3 and 4 of the body 110, respectively, and connected to the first and second internal electrodes 121 and 122, respectively. First and second external electrodes 131 and 132 may be included. For example, the first external electrode 131 may be disposed on the third surface 3 of the body and connected to the first internal electrode 121, and the second external electrode 132 may be disposed on the fourth surface 4 of the body and connected to the second internal electrode 122.

The external electrodes 131 and 132 may be formed of any material as long as they have electrical conductivity, such as metal, and a detailed material may be determined in consideration of electrical characteristics, structural stability, and the like, and may further have a multilayer structure.

For example, the external electrodes 131 and 132 may include electrode layers 131a and 132a disposed on the body 110 and plating layers 131b and 132b disposed on the electrode layers 131a and 132a.

As a more detailed example of the electrode layers 131a and 132a, the electrode layers 131a and 132a may be fired electrodes made of conductive metal and glass or resin-based electrodes made of conductive metal and resin.

In addition, the electrode layers 131a and 132a may have a form in which a plastic electrode and a resin-based electrode are sequentially formed on the body.

In addition, the electrode layers 131a and 132a may be formed by transferring a sheet containing a conductive metal onto a body or by transferring a sheet containing a conductive metal onto a fired electrode.

The conductive metal used in the electrode layers 131a and 132a is not particularly limited as long as it is a material that may be electrically connected to the internal electrodes 121 and 122 to form capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti) and alloys thereof. The electrode layers 131a and 132a may be formed by applying a conductive paste prepared by adding glass frit to the conductive metal powder and then sintering the same.

The plating layers 131b and 132b serve to improve mounting characteristics.

The type of the plating layers 131b and 132b is not particularly limited, and may be a single plating layer 131b or 132b containing at least one of nickel (Ni), tin (Sn), palladium (Pd), and alloys thereof, and may be formed of a plurality of layers.

For a more detailed example of the plating layers 131b and 132b, the plating layers 131b and 132b may be Ni plating layers or Sn plating layers, Ni plating layers and Sn plating layers may be sequentially formed on the electrode layers 131a and 132a, and a Sn plating layer, a Ni plating layer, and a Sn plating layer may be sequentially formed. In addition, the plating layers 131b and 132b may include a plurality of Ni plating layers and/or a plurality of Sn plating layers.

The size of the multilayer electronic component 100 does not need to be particularly limited.

However, to obtain miniaturization and high capacity at the same time, the thickness of the dielectric layer and the internal electrode must be thinned to increase the number of layers. In the laminated electronic component 100 having a size of 1005 (length×width, 1.0 mm×0.5 mm) or a size of 0402 (length×width, 0.4 mm×0.2 mm), the effect of improving the moisture resistance reliability according to the present disclosure is more remarkable.

Although the embodiments of the present disclosure have been described in detail above, the present disclosure is not limited by the above-described embodiments and the accompanying drawings, and is intended to be limited by the appended claims. Therefore, various forms of substitution, modification and change will be possible by those skilled in the art within the scope of the technical spirit of the present disclosure described in the claims, and this will also be said to fall within the scope of the present disclosure.

Hereinafter, the present disclosure will be described in more detail through examples, but this is to help a detailed understanding of the invention, and the scope of the present disclosure is not limited by the examples.

EXAMPLE

In Table 1 below, 750 0402 (length×width, 0.4 mm×0.2 mm) size chips having 0.47 μF and 6.3 V characteristics are mounted on each channel to prepare samples, and then, as follows, high-temperature reliability, moisture resistance reliability, breakdown voltage (BDV) (unit: V) values were measured, and by varying the average carbon content (Cc2) of the outer cover portion compared to the average carbon content (Cc1) of the inner cover portion, the high-temperature reliability and moisture resistance reliability BDV avg (V) values were measured.

Sample 1 corresponds to a chip having a conventional cover portion structure including only an inner cover portion without an outer cover portion. For example, the cover portion of Sample 1 does not contain a carbon compound.

Samples 2 to 7 correspond to chips having a cover portion structure including a conventional inner cover portion and an outer cover portion including cellulose nanofibers on the inner cover portion.

The high-temperature reliability evaluation corresponds to the value of confirming the number of defective chips among 750 chips when the temperature condition is 150° C. and the voltage condition is 18.9V for 6 hours.

The moisture resistance reliability evaluation corresponds to the value of confirming the number of defective chips among 750 chips when the temperature condition is 85° C., the relative humidity is 85%, and the voltage condition is 12.6 V for 3 hours.

BDV avg (V) evaluation means the average of the voltage values (V) at which 750 chips were destroyed under the DV electric field.

TABLE 1

| Sample | Cc2/Cc1 | High temperature reliability | Moisture resistance reliability | BDV avg (V) |
|---|---|---|---|---|
| 1 | — | 9/750 | 3/750 | 46.75 |
| 2 | 1 | 9/750 | 2/750 | 49.47 |
| 3 | 10 | 3/750 | 0/750 | 51.04 |
| 4 | 100 | 1/750 | 0/750 | 53.14 |
| 5 | 1,000 | 0/750 | 0/750 | 52.58 |
| 6 | 10,000 | 0/750 | 0/750 | 51.54 |
| 7 | 100,000 | 8/750 | 3/750 | 46.23 |

Sample 1 corresponds to a chip having a conventional cover portion structure without an outer cover portion, and 9 defects occurred in the high-temperature reliability evaluation and 3 defects occurred in the moisture resistance evaluation, and the average BDV was measured as 46.75V.

Samples 2 to 7 correspond to a cover portion structure in which an outer cover portion including cellulose nanofibers is disposed on an inner cover portion.

Sample 2 had a Cc2/Cc1 value of 1, and 9 defects occurred in the high-temperature reliability evaluation and 3 defects in the moisture resistance evaluation. The average BDV was measured as 49.47V, sample 7 corresponds to a Cc2/Cc1 value of 100,000, and there were 8 defects in the high-temperature reliability evaluation and 3 defects in the moisture resistance evaluation. The average BDV was measured as 46.23V.

On the other hand, Samples 3 to 6, which are examples of the present disclosure, satisfy $10 \leq Cc2/Cc1 \leq 10,000$, and 3, 1, and 0 defects occurred in the high-temperature reliability evaluation, and in the moisture resistance reliability evaluation, 0 defects occurred, and the average BDV values were measured at 51.04V, 53.14V, 53.14V, 52.58V, and 51.54V.

For example, when the range of $10 \leq Cc2/Cc1 \leq 10,000$ was satisfied, excellent results were illustrated in high temperature reliability, moisture resistance reliability, and average BDV value. It can be seen that in the range of Cc2/Cc1<10 or Cc2/Cc1>10,000, poor results are illustrated.

For example, it can be seen that reliability is improved when the outer cover portion includes cellulose nanofibers and the content ratio of carbon content satisfies the above range, and it can be seen that when the content of cellulose nanofibers is insufficient or excessive, reliability is not sufficiently improved, or rather, reliability is deteriorated.

As set forth above, according to an embodiment, moisture resistance reliability of multilayer electronic components may be improved.

The high-temperature reliability of multilayer electronic components may also be improved.

Electrical characteristics of multilayer electronic components may be improved.

The expression 'an embodiment' used in this specification does not mean the same embodiment, and is provided to emphasize and describe different unique characteristics. However, an embodiment presented above is not excluded from being implemented in combination with features of another embodiment. For example, even if a matter described in one detailed embodiment is not described in another embodiment, it may be understood as a description related to another embodiment unless there is a description contradicting or contradicting the matter in another embodiment.

Terms used in this specification are only used to describe an embodiment, and are not intended to limit the present disclosure. In this case, singular expressions include plural expressions unless the context clearly indicates otherwise.

While embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a plurality of dielectric layers and a plurality of internal electrodes stacked in a first direction with the plurality of dielectric layers interposed therebetween; and
an external electrode disposed on the body in a second direction, perpendicular to the first direction, and connected to the plurality of internal electrodes,
wherein the body includes an active portion including the plurality of internal electrodes to form capacitance, and cover portions disposed on both end surfaces of the active portion in the first direction, and
the cover portions include an outer cover portion including a carbon compound and an inner cover portion disposed between the active portion and the outer cover portion,
wherein an average carbon content (Cc2) of the outer cover portion compared to an average carbon content (Cc1) of the inner cover portion satisfies $100 \leq Cc2/Cc1 \leq 10,000$.

2. The multilayer electronic component of claim 1, wherein the carbon compound includes at least one selected from cellulose nanofibers, carbon nanotubes, carbon nanofoam, hydrocarbons, fullerenes, and nano clays.

3. The multilayer electronic component of claim 1, wherein the average carbon content (Cc1) of the inner cover portion satisfies $0 \text{ ppm} < Cc1 \leq 100 \text{ ppm}$.

4. The multilayer electronic component of claim 1, wherein a porosity of the inner cover portion is higher than a porosity of the outer cover portion.

5. The multilayer electronic component of claim 1, wherein the inner cover portion includes a heterogeneous carbon compound different from the carbon compound.

6. The multilayer electronic component of claim 1, wherein an average size of at least one of the cover portions in the first direction is 100 μm or less.

7. The multilayer electronic component of claim 1, wherein an average size, tc2, of the outer cover portion in the first direction compared to an average size, tc, of at least one of the cover portions in the first direction satisfies $0.1 < tc2/tc < 0.9$.

8. The multilayer electronic component of claim 1, wherein the body includes a margin portion disposed on both end surfaces of the active portion in a third direction perpendicular to the first and second directions,
wherein the margin portion includes an outer margin portion containing the carbon compound and an inner margin portion disposed between the active portion and the outer margin portion,
wherein an average carbon content (Mc2) of the outer margin portion compared to an average carbon content (Mc1) of the inner margin portion satisfies $100 \leq Mc2/Mc1 \leq 10,000$.

9. The multilayer electronic component of claim 8, wherein an average size of the margin portion in the third direction is 100 μm or less.

10. The multilayer electronic component of claim 8, wherein an average size, wm2, of the outer margin portion in the third direction relative to an average size, wm, of the margin portion in the third direction satisfies 0.1<wm2/wm<0.9.

11. The multilayer electronic component of claim 1, wherein the carbon compound includes cellulose nanofibers.

12. The multilayer electronic component of claim 1, wherein the carbon compound includes only cellulose nanofibers.

13. The multilayer electronic component of claim 1, wherein the outer cover portion includes a single carbon compound.

14. A multilayer electronic component comprising:
a body including a plurality of dielectric layers and a plurality of internal electrodes stacked in a first direction with the plurality of dielectric layers interposed therebetween; and
an external electrode disposed on the body in a second direction, perpendicular to the first direction, and connected to the plurality of internal electrodes,
wherein the body includes an active portion including the plurality of internal electrodes to form capacitance and a margin portion disposed on both end surfaces of the active portion in a third direction perpendicular to the first and second directions, and
the margin portion includes an outer margin portion containing a carbon compound and an inner margin portion disposed between the active portion and the outer margin portion,
wherein an average carbon content (Mc2) of the outer margin portion compared to an average carbon content (Mc1) of the inner margin portion satisfies 100≤Mc2/Mc1≤10,000.

15. The multilayer electronic component of claim 14, wherein the carbon compound includes at least one selected from cellulose nanofibers, carbon nanotubes, carbon nanofoam, hydrocarbons, fullerenes, and nano clays.

16. The multilayer electronic component of claim 14, wherein the average carbon content (Mc1) of the inner margin portion satisfies 0 ppm<Mc1≤100 ppm.

17. The multilayer electronic component of claim 14, wherein a porosity of the inner margin portion is higher than a porosity of the outer margin portion.

18. The multilayer electronic component of claim 14, wherein the inner margin portion includes a heterogeneous carbon compound different from the carbon compound.

19. The multilayer electronic component of claim 14, wherein an average size of the margin portion in the third direction is 100 μm or less.

20. The multilayer electronic component of claim 14, wherein an average size, wm2, of the outer margin portion in the third direction relative to an average size, wm, of the margin portion in the third direction satisfies 0.1<wm2/wm<0.9.

* * * * *